United States Patent [19]
Hansen

[11] Patent Number: 5,722,586
[45] Date of Patent: Mar. 3, 1998

[54] PORTABLE HANGING DESK

[76] Inventor: David Kent Hansen, 757 E. Phillips Dr. North, Littleton, Colo. 80122

[21] Appl. No.: 653,048

[22] Filed: May 28, 1996

[51] Int. Cl.⁶ ............................................. A47B 23/00
[52] U.S. Cl. ........................................ 108/44; 108/47
[58] Field of Search ............................ 108/42, 44, 45, 108/46, 152, 47

[56] References Cited

U.S. PATENT DOCUMENTS

| | | | |
|---|---|---|---|
| 1,593,835 | 7/1926 | McNeal et al. | 108/47 |
| 1,952,377 | 3/1934 | Lack | 108/47 |
| 2,016,970 | 10/1935 | Nussbaum | 108/46 |
| 2,601,177 | 6/1952 | Smullen | 108/47 X |
| 2,640,597 | 6/1953 | Thompson | 108/47 X |
| 2,687,336 | 8/1954 | Smith et al. | 108/47 X |
| 3,859,931 | 1/1975 | Lalonde | 108/44 |
| 5,443,018 | 8/1995 | Cromwell | 108/44 |
| 5,479,866 | 1/1996 | Rae | 108/44 |

FOREIGN PATENT DOCUMENTS

| | | | |
|---|---|---|---|
| 532596 | 11/1956 | Canada | 108/44 |
| 2639198 | 5/1990 | France | 108/44 |
| 176311 | 4/1935 | Switzerland | 108/47 |

*Primary Examiner*—Jose V. Chen
*Attorney, Agent, or Firm*—John L. Isaac

[57] ABSTRACT

A portable desk is disclosed for hanging from the rear portion of a seat back. The desk includes a table board having substantially planer upper and lower surfaces, a top portion and a bottom portion. A pair of mounting brackets are provided with each such bracket having a mounting portion securable to the table board bottom surface and an attachment portion extending beyond the top portion of the table board. The attachment portion includes connection members for releasable attachment to the top of a seat back. Support members extend from the table board bottom surface for bracing the table board against the rear surface of a seat back to define the operational angle of the desk relative to the seat back. Finally, a support ledge is disposed along the upper table board surface at the bottom portion to provide a brace for materials placed on the table board upper surface during the use of the desk.

19 Claims, 2 Drawing Sheets

5,722,586

PORTABLE HANGING DESK

BACKGROUND OF THE INVENTION

1. Field of the Invention

The present invention relates to portable desks and, more particularly, to portable desk assemblies adapted for connection to a seat back for use by a person sitting behind such seat. Specifically, the present invention relates to a portable desk particularly useful in commuter vehicles for attachment to a seat back hardware commonly found in such vehicles.

2. Description of the Prior Art

It is often difficult to work or write in the back seat of an automobile, a railroad coach, an airplane or a bus. Back seat automobile occupants or occupants of common carriers have often resorted to supporting a work surface on their lap, which is uneven and unstable. This is not only highly inconvenient to the passenger due to the difficulty of holding the work surface steady, but it is also difficult to maintain support at a proper elevation to permit the writing or reading to be performed with sufficient comfort and ease.

Prior art desks for use in automobiles, for example, have typically been bulky and cumbersome devices which clutter the interior of the automobile when not in use. Such desks for use in common carriers such as trains or busses are likewise cumbersome. Children riding in the back seat of vehicles, especially on long trips, tend to become irritable and restless. The desk of the present invention would supply a pleasant diversion for such children.

Various types of relatively portable desks or tables have been devised in the past. Examples of desks adaptable to folding chairs and the like are disclosed in U.S. Pat. No. 2,278,014, No. 2,973,028 and No. 3,387,882. Unfortunately, while these devices are adaptable to folding chairs, that are not necessarily adaptable to seat backs, particularly those found in common carriers such as in a bus or a railroad coach. U.S. Pat. No. 547,830 discloses a detachable desk arrangement for use with a railroad car seat, while U.S. Pat. No. 2,503,602, No. 2,787,508 and No. 4,792,183 all disclosed detachable desk members designed for removable connection to the backs of automobile seats. These devices may be useful in automobiles where they can be stored in trunks, but they are not particularly easy to carry on or use in a commuter situation. Commuters, who utilize commuting trains or busses, must carry such devices on and off of the carriers. In addition, the seats in such common carriers frequently have handle-like bars that extend across the top portions thereof to assist passengers in sitting and getting up. However, such handles may interfere with several of the devices disclosed in the references. Therefore, there is still a need for a light-weight, portable desk device which is particularly suitable for commuters using common carriers so that they may be easily carried onto and off of the carrier, in a briefcase or the like.

SUMMARY OF THE INVENTION

Accordingly, it is one object of the present invention to provide a portable desk adapted for hanging from the top edge of a seat back.

It is another object of the present invention to provide a portable desk device which is particularly adaptable for use on a common carrier such as a bus or a train.

Yet another object of the present invention is to provide a portable desk which may be attached to the seat handles typically found on seats in busses and commuter railroad cars.

Still another object of the present invention is to provide a portable desk device which is compact and light-weight to enable easy transportation and enclosure within a briefcase.

To achieve the foregoing and other objects and in accordance with the purpose of the present invention, as embodied and broadly described herein, a portable desk is adapted for hanging from the rear portion of a seat back. The desk includes a table board having substantially planer upper and lower surfaces, a top portion and a bottom portion. A pair of mounting brackets are provided with each such bracket having a mounting portion securable to the table board bottom surface, and an attachment portion extending beyond the top portion of the table board. The attachment portion includes connection members for releasable attachment to the top of a seat back. Support members extend from the table board bottom surface for bracing the board against the rear surface of a seat back to define the operational angle of the desk relative to the seat back. Finally, a support ledge is disposed along the table board upper surface at the bottom portion to provide a brace for materials placed on the board upper surface during the use of the desk.

BRIEF DESCRIPTION OF THE DRAWINGS

The accompanying drawings which are incorporated in and form a part of the specification illustrate a preferred embodiment of the present invention and, together with a description, serve to explain the principles of the invention. In the drawings.

DETAILED DESCRIPTION OF THE PREFERRED EMBODIMENTS

Figure 1:
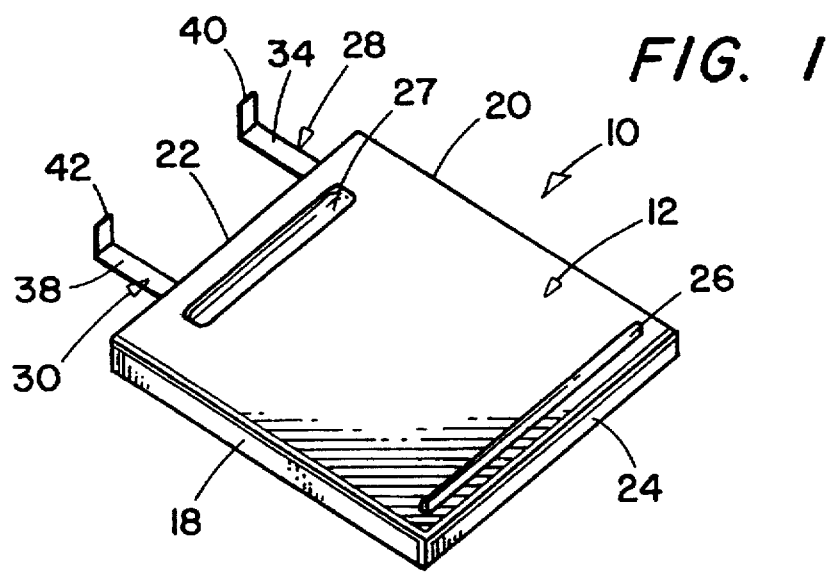
FIG. 1 is a top perspective view of a portable hanging desk constructed in accordance with the present invention.
Figure 2:
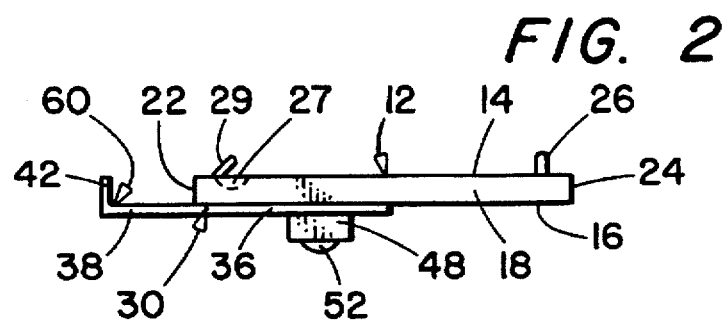
FIG. 2 is a side view of a the embodiment illustrated in FIG. 1.
Figure 3:
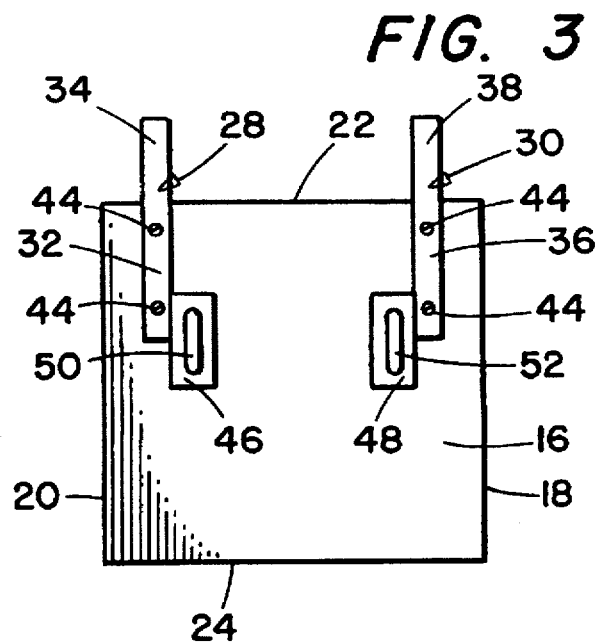
FIG. 3 is a bottom plan view of the embodiment illustrated in FIG. 1.

Referring first to FIGS. 1-3, a portable desk device 10 is illustrated. The desk device 10 includes a deck top or table board 12 which may be constructed from wood, plastic or other hard material. In preferred form, the desk top 12 is approximately 11-12 inches in length and substantially square in shape. However, the dimensions of the desk top 12 as well as the shape, that is square or rectangular, may be modified according to the desired end use. The desk top 12 includes an upper surface 14, a lower surface 16, a pair of side edges 18, 20, a top edge 22 and a bottom edge 24. Disposed along the upper surface 14 proximate the bottom edge 24 is a ledge 26 which projects upwardly from the surface 14. The purpose of the ledge 26 is to act as a stop member for books, writing materials or other materials placed on the upper surface 14 so as to prevent them from sliding off the desk top 12 during use thereof. In one embodiment of the preferred invention, a receptacle 27 may be located along the upper surface 14 proximate the top edge 22. The receptacle 27 is preferably in the form of an elongated trough which is sized and shaped to hold pencils, pens or other materials. The receptacle 27 also preferably includes a cover 29 which is designed to close the receptacle 27 during transportation of the desk 10.

Disposed along the bottom surface 16 of the desk top 12 are a pair of mounting brackets 28, 30. The mounting bracket 28 includes a mounting portion 32 and an attachment portion 34, while the mounting bracket 30 likewise includes a mounting portion 36 and an attachment portion 38. The attachment portion 34 of the mounting bracket 28 includes an end piece 40, while the attachment portion 38 of the mounting bracket 30 likewise includes an end piece 42. The end pieces 40 and 42 are feet or hook members in the form of a substantially "L" shaped piece. The end pieces 40, 42 are utilized to secure the desk 10 in its operational position as described in greater detail below. The mounting portions 32 and 36 of the brackets 28, 30 are preferably secured to the bottom surface 16 of the desk top 12 by a plurality of attachment members 44, which are preferably in the form of screws, bolts or other similar type of removable attachment mechanism. In this manner, the mounting brackets 28, 30 may be removed and reversed so as to provide opposite orientations for the end pieces 40, 42. This provides an alternate form of attachment of the desk 10 to a seat back as described in greater detail below. In preferred form, the mounting brackets 28, 30 are made of metal or hard plastic designed to carry a substantial amount of weight. This is very important for the end pieces 40, 42, since the majority of the weight of the desk 10 as well as the pressure placed thereon by a user of the desk 10 are carried by the end or hook pieces 40, 42.

A pair of support members 46, 48 are also attached to the bottom surface 16 of the desk top 12. In preferred form, the support members 46, 48 are disposed alongside the mounting brackets 28, 30 on their inner edges. In one form of the present invention, the support members 46, 48 may be adjustable in location lengthwise along the desk top 10. Secured to the end surface of the support members 46, 48 are a pair of rubber bumpers 50, 52. These bumpers 50, 52 are designed to engage the rear surface of a seat back to which the desk 10 is secured, to prevent damage to the seat back by rubbing and abrasion. The support members 46, 48 may be constructed from any suitable materials such as wood, plastic or the like and may be permanently mounted to the bottom surface 16 or mounted for longitudinal movement therealong in an alternate embodiment.

Figure 4:
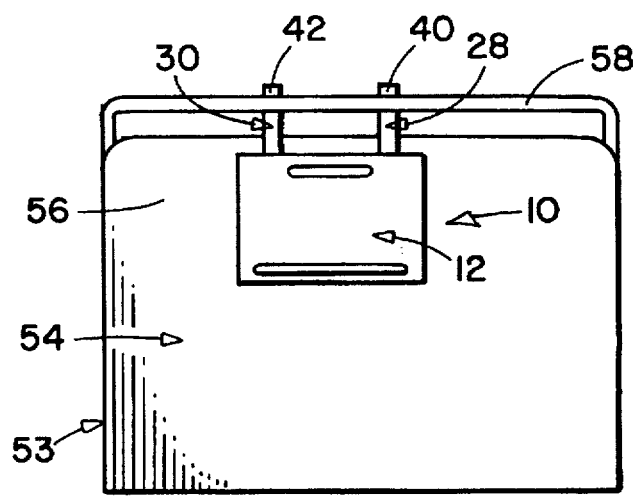
FIG. 4 is a rear perspective view of the hanging desk of the present invention secured for use to the rear of a seat back.
Figure 5:
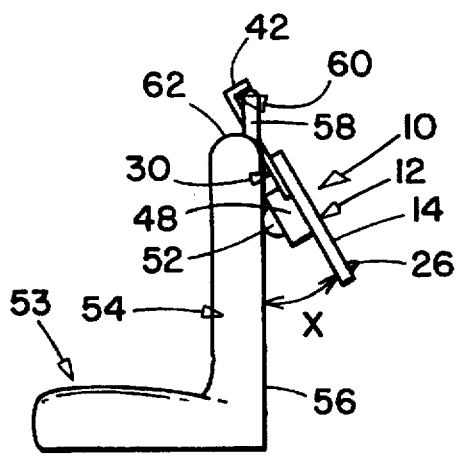
FIG. 5 is a side perspective view of the embodiment illustrated in FIG. 4

Referring now to FIGS. 4 and 5, the desk 10 is preferably for use by commuters or other people sitting behind a seat 53 having a seat back 54. The seat back 54 has a rear surface 56, and in many instances such as in busses and commuter trains, includes a handrail 58 which is designed to enable passengers to more readily get in and out of the seats. In this instance, however, the metal handle 58 is utilized to advantage by placing the attachment portions 34 and 38 of the mounting brackets 28, 30 underneath the handle 58 so as to engage the end pieces 40, 42 with the handle 58 as clearly illustrated in FIG. 5. Thus, the handle 58 seats in juncture 60 which is between the end pieces 40, 42 and their respective attachment portions 34, 38 (see FIG. 2). Once this engagement has been accomplished, the desk top 12 is allowed to fall and rotate about the juncture 60 until the rubber bumpers 50, 52 of the support members 46, 48 engage the rear surface 56 of the seat back 54. Thus, engagement between the two support members 46, 48 and the two attachment portions 34, 38 with the seat back 54 provide firm support for maintaining the desk 10 in its operational, inclined position illustrated FIG. 5. In this manner, books, writing materials or the like can be placed upon the upper surface 14, thereby allowing the commuting time to be used effectively.

Figure 6:
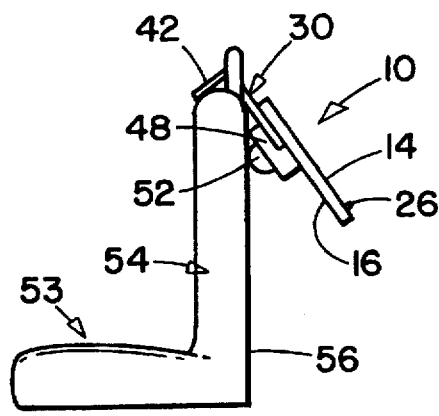
FIG. 6 is a view similar to that of FIG. 5 but illustrating the attachment members in a reverse orientation.
Figure 7:
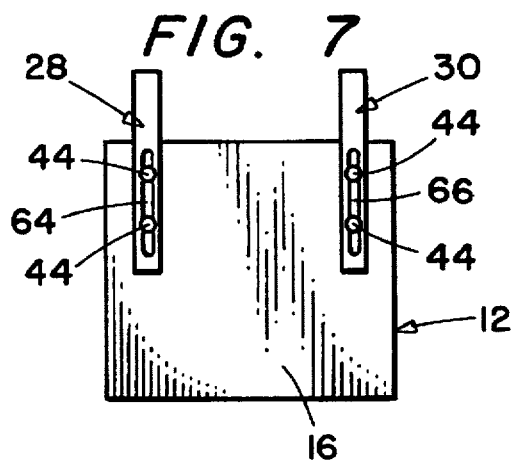
FIG. 7 is a view similar to that of FIG. 3 but illustrating an alternate embodiment for the mounting members having length adjustable means.

In an alternate embodiment of the present invention, as illustrated in FIG. 6, the mounting portions 32, 36 may be detached from the desk top 12 and reattached in a 180° orientation so as to direct the end pieces 40, 42 away from the bottom surface 16, which is just the opposite of the embodiment illustrated in FIG. 5. When this occurs, the end pieces 40, 42 may be engaged with the very top 62 of the seat 54 if the handles 58 are too high or nonexistent. The support members 46, 48 and the bumpers 50, 52 carried thereby engage the seat back 54 as in the prior embodiment.

In yet another alternate embodiment of the present invention, the support member 28 may include a central slot 64, while the support member 30 may include a similar central slot 66. In this instance, it is important to note that the attachment members 44 have head portions that are wider in diameter than the width of the slots 64, 66. In this embodiment, the attachment members 44 may be loosened, and the mounting brackets 28,30 may be moved longitudinally or lengthwise relative to the rear surface 16 of the desk top 12 so as to make a longitudinal adjustment to change the inclination angle "X" by leaving the desk top 12 higher or lower relative to the seat back 54. The shorter the distance between the end pieces 40, 42 and the top edge 22, the larger the angle of inclination "X". Likewise, the longer the distance between the end pieces 40, 42 and the top edge 22, the smaller the angle "X" of inclination. In this manner, a user of the desk 10 may adjust the desk 10 for the most comfortable angle of inclination depending upon the spacing between the seats as well as the height of the seals and the like.

Figure 8:
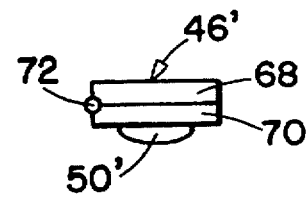
FIG. 8 is a side perspective view of an alternate embodiment for the support member of the present member.
Figure 9:
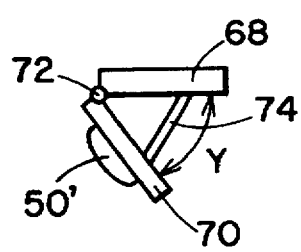
FIG. 9 is a view similar to that of FIG. 8 but illustrating the alternate support member in its open or raised position.

Referring to FIGS. 8 and 9, another manner of increasing or decreasing the angle of inclination "X" is illustrated. In this embodiment of the present invention, each support member 46 and 48 is bifurcated into a unit 46' having two portions 68 and 70. The portions 68 and 70 are interconnected at one end by a spring hinge 72 that is designed to normally maintain the support portions 68 and 70 in a closed position as illustrated in FIG. 8. However, when it is desired to increase the angle of inclination "X", the lower or bottom member 70 is moved away from the member 68, which is secured to the bottom 16 of the desk top 12, a desired amount so as to increase the angle of inclination "X". Once the desired angle of inclination "X" is achieved, the angle "Y" between the members 68, 70 is maintained by placing a spacer bar 74 or the like therebetween. In each instance, the bumper 50' is engaged with the rear surface 56. It should be understood, however, that other alternate mechanical means of maintaining the members 68, 70 in a spaced angular relationship designated by the angle "Y" may be utilized.

As can be see from the above, the desk 10 of the present invention is light-weight and small and easily carried by a commuter either by itself or in a briefcase or the like. The desk 10 of the present invention enables such a commuter to utilize his or her commuting time effectively by providing a working surface in the bus or train. This working surface is sufficiently small and easy to attach and detach, so as to prevent the user of such a desk from annoying fellow passengers in the form of unnecessary movement or the taking up of unnecessary space. The desk 10 is easily adaptable to a number of different environments regardless of the size of the seats, and whether a seat handle is present or not. The desk 10 of the present invention is fully adjustable to enable the user thereof to orient the desk at the optimal inclination angle selected for that particularly user's comfort as well as the situation provided by the commuter vehicle. It should be noted., however, that the present invention is also useful in automobiles or any other type of vehicle wherein a passenger sits behind a seat. Despite the present invention's adaptability and comfortability, the present invention is compact and not cumbersome, unlike many prior art devices. The present invention is especially adaptable to commuter trains and busses that have handles across the tops thereof that may interfere with other prior art devices yet provide the specific support means for use of the present invention which is simple, inexpensive and very versatile.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A portable desk adapted for hanging from the rear portion of a seat back, said desk comprising:
   a table board having substantially planer upper and lower surfaces, a top portion and a bottom portion;
   a pair of mounting brackets defining a mounting means for releasable attachment to the top of a seat back, each said bracket having a mounting portion secured to and extending laterally substantially parallel with said table board bottom surface and adjustable lengthwise relative to said table board bottom surface to provide overall length adjustment of said mounting bracket, and an attachment portion extending in the same plane as said mounting portion laterally outwardly beyond the top portion of said table board substantially parallel to the plane of said table board bottom surface, said attachment portion including connection members projecting angularly outwardly from the distal end thereof;
   support means projecting and extending directly from said table board bottom surface for contacting and bracing said board against the rear surface of a seat back to define the operational angle of said desk relative to said seat back; and
   a ledge disposed along said upper table board surface at said bottom portion to provide a support for materials placed on said table board upper surface during use of said desk.

2. The desk as claimed in claim 1, wherein said attachment portion of each said mounting bracket comprises an angled foot member projecting from the distal end thereof and adapted for hooking over the top of said seat back or a bar extending across the top of said seat back.

3. The desk as claimed in claim 2, wherein the mounting portion of each said mounting bracket is reversible in its attachment to said table board bottom surface to selectively orient said angled foot member in one of two opposite directions depending on the design of the seat back portion to which said desk is to be attached.

4. The desk as claimed in claim 1, wherein said support means includes means for selectively adjusting the angle between said table board and the rear surface of said seat back when it is in its operational position.

5. The desk as claimed in claim 1, wherein said support means comprises a pair of knobs extending outwardly from said table board bottom surface.

6. The desk as claimed in claim 5, wherein said pair of knobs are aligned adjacent to said pair of mounting brackets.

7. The desk as claimed in claim 5, wherein each said knob includes a bumper member projecting outwardly therefrom for engagement with the rear surface of said seat back.

8. The desk as claimed in claim 5, wherein each said knob includes means for pivoting said knob away from said table board rear surface to effectively increase the angle between said desk and said scat back when said desk is in its operational position.

9. A portable desk for removable attachment to the back of a seat, said seat selectively having a bar handle disposed across the top thereof, said desk comprising:
   a desk top having an upper working surface, a lower surface, a top edge and a bottom edge;
   a pair of mounting brackets secured to said desk top lower surface and defining a mounting means for releasable attachment to said seat bar handle, each said mounting bracket including a mounting portion secured to and extending laterally substantially parallel with said desk top lower surface and adjustable lengthwise relative to said desk top lower surface to provide overall length adjustment of said bracket, and an attachment portion extending in the same plane as said mounting portion laterally outwardly beyond said top edge substantially parallel to the plane of said desk top lower surface and including a connection member projecting angularly outwardly at the distal end thereof;
   support means projecting and extending directly from said desk top lower surface for contacting and bracing said desk to against the rear surface of said seat back to define the incline of said desk top relative to said seat back; and
   a support ledge disposed along said desk top upper surface proximate the bottom edge thereof to provide a rest stop for materials placed on said desk top during use thereof.

10. The desk as claimed in claim 9, wherein said support means include means for selectively adjusting the inclination of said desk top relative to said seat back.

11. The desk as claimed in claim 10, wherein said support means comprises a pair of knobs projecting from said desk top lower surface.

12. The desk as claimed in claim 11, wherein each said knob includes a bumper member for engagement with said seat back.

13. The desk as claimed in claim 11, wherein said inclination adjustment means comprises a pair of pivot members each securing one said knob to said desk top to provide selective pivotal movement between said knobs and said desk top to adjust the inclination of said desk top.

14. The desk as claimed in claim 9, wherein said connection member comprises an "L" end piece adapted for hooking said bar handle.

15. The desk as claimed in claim 14, wherein each said mounting bracket is adjustable to selectively point said "L" end piece upwardly for attachment to said bar handle or downwardly for attachment to the upper edge of said seat back.

16. The desk as claimed in claim 9, wherein said desk top includes a recessed area disposed in the upper surface thereof for receiving writing instruments, and an integral cover connected to clearly cover said recess during non-use of said desk.

17. A portable commuter desk for removable attachment to a bar handle disposed across the top portion of a seat back, said desk comprising:

a desk top having an upper working surface, a lower surface, a top edge and a bottom edge;

a pair of mounting brackets secured to said desk top lower surface and defining a mounting means for releasable attachment to said seat bar handle, each said bracket including a mounting portion secured to and extending laterally substantially parallel with said lower surface and adjustable lengthwise relative to said lower surface to provide overall length adjustment of said bracket, and an attachment portion extending in the same plane as said mounting portion laterally outwardly beyond said top edge substantially parallel to the plane of said lower surface for hanging engagement with said bar handle;

a connection member disposed and projecting angularly outwardly at the distal end of each said attachment portion;

a pair of support legs projecting and extending directly from said desk top lower surface for contacting and bracing said desk top against the rear surface of said seat back as said mounting brackets hang from said bar handle to provide steady support and to define the operational incline of said desk top relative to said seat back; and a ledge disposed on said desk top upper surface proximate said bottom edge.

18. The desk as claimed in claim 17, wherein each said connection member comprises an angled element adapted for engagement with said bar handle to carry said desk top and rotate about said bar handle until said support legs abut said seat back.

19. The desk as claimed in claim 18, wherein said support legs include rubber bumpers adapted for engagement with the rear surface of said seat back.

\* \* \* \* \*